(12) United States Patent
Haven et al.

(10) Patent No.: US 11,029,713 B2
(45) Date of Patent: Jun. 8, 2021

(54) METHOD AND SYSTEM FOR EXPANDING THE RANGE OF WORKING ENVIRONMENTS IN WHICH A 3-D OR DEPTH SENSOR CAN OPERATE WITHOUT DAMAGING OR DEGRADING THE MEASUREMENT PERFORMANCE OF THE SENSOR

(71) Applicant: Liberty Reach Inc., Clearwater, ID (US)

(72) Inventors: G. Neil Haven, Clearwater, ID (US); David J. Witalka, East Lansing, MI (US)

(73) Assignee: Liberty Reach Inc., Clearwater, ID (US)

( * ) Notice: Subject to any disclaimer, the term of this patent is extended or adjusted under 35 U.S.C. 154(b) by 135 days.

(21) Appl. No.: 15/822,683

(22) Filed: Nov. 27, 2017

(65) Prior Publication Data

US 2019/0163214 A1    May 30, 2019

(51) Int. Cl.
| | | |
|---|---|---|
| *G05D 23/19* | (2006.01) | |
| *G01D 11/30* | (2006.01) | |
| *G01D 11/24* | (2006.01) | |
| *G01D 3/10* | (2006.01) | |
| *G01B 11/00* | (2006.01) | |
| *G01S 17/89* | (2020.01) | |

(52) U.S. Cl.
CPC ......... *G05D 23/1917* (2013.01); *G01B 11/00* (2013.01); *G01D 3/10* (2013.01); *G01D 11/245* (2013.01); *G01D 11/30* (2013.01); *G01S 17/89* (2013.01); *G06T 2207/10028* (2013.01)

(58) Field of Classification Search
CPC ........ G01D 11/245; G01D 11/30; G01D 3/10; G05D 23/1917; G01B 11/00; G01S 17/89; G06T 2207/10028
See application file for complete search history.

(56) References Cited

U.S. PATENT DOCUMENTS

| | | | |
|---|---|---|---|
| 6,459,951 B1 * | 10/2002 | Griffith | B23K 26/032 156/64 |
| 6,542,249 B1 | 4/2003 | Kofman et al. | |
| 9,248,353 B1 | 2/2016 | Koenig et al. | |

(Continued)

OTHER PUBLICATIONS

EP Application No. 17186892 EP Search Report dated Dec. 18, 2017.
U.S. Appl. No. 15/249,613 Office Action dated Dec. 22, 2017.

*Primary Examiner* — Mohammad Ali
*Assistant Examiner* — Vincent W Chang
(74) *Attorney, Agent, or Firm* — Brooks Kushman P.C.

(57) ABSTRACT

A method and system for expanding the range of working environments in which a 3-D or depth sensor can operate without damaging or degrading the measurement performance of the sensor are provided. The sensor has a rigid support structure and a plurality of optoelectronic components fixedly supported on the support structure. The system includes an enclosure for enclosing the support structure and the supported optoelectronic components within an interior of the enclosure. A temperature control circuit includes a controller to monitor interior temperature within the enclosure and to regulate temperature within the enclosure to be within an operational temperature range of the sensor based on the monitored temperature.

13 Claims, 4 Drawing Sheets

(56) References Cited

U.S. PATENT DOCUMENTS

| | | |
|---|---|---|
| 2004/0246471 A1 | 12/2004 | Matsuura et al. |
| 2004/0253010 A1 | 12/2004 | Takahashi |
| 2006/0071154 A1 | 4/2006 | Osako et al. |
| 2007/0200064 A1* | 8/2007 | Remillard ............... G02B 23/12 |
| | | 250/330 |
| 2007/0229661 A1 | 10/2007 | Aoki et al. |
| 2008/0137087 A1* | 6/2008 | Greten ................. G01N 21/359 |
| | | 356/445 |
| 2010/0118123 A1 | 5/2010 | Freedman et al. |
| 2011/0134114 A1 | 6/2011 | Rais et al. |
| 2011/0205341 A1 | 8/2011 | Wilson et al. |
| 2014/0036070 A1 | 2/2014 | Eckard et al. |
| 2014/0246544 A1* | 9/2014 | Bullard ................. G01D 11/245 |
| | | 244/171.8 |
| 2015/0124086 A1 | 5/2015 | Melle et al. |
| 2015/0266153 A1 | 9/2015 | Kanehira et al. |
| 2016/0104806 A1* | 4/2016 | Thrush ................... H01L 31/024 |
| | | 257/434 |
| 2016/0229618 A1* | 8/2016 | Savic .................. B65D 43/0202 |
| 2016/0261348 A1* | 9/2016 | Murakami ............ H04B 10/548 |
| 2016/0284525 A1* | 9/2016 | Katzlinger ............. G01N 21/15 |
| 2017/0242048 A1* | 8/2017 | Sommer ................. F25B 21/02 |
| 2017/0287212 A1 | 10/2017 | Tran et al. |
| 2018/0031364 A1* | 2/2018 | Kallay .................... G01B 11/22 |
| 2018/0061043 A1* | 3/2018 | Bartos .................. G06T 7/0008 |
| 2018/0074175 A1* | 3/2018 | O'Keeffe ................ G01S 17/04 |
| 2019/0137090 A1* | 5/2019 | Jiang ..................... F21V 29/763 |

* cited by examiner

METHOD AND SYSTEM FOR EXPANDING THE RANGE OF WORKING ENVIRONMENTS IN WHICH A 3-D OR DEPTH SENSOR CAN OPERATE WITHOUT DAMAGING OR DEGRADING THE MEASUREMENT PERFORMANCE OF THE SENSOR

TECHNICAL FIELD

At least one embodiment of the present invention generally relates to methods and systems for expanding the range of working environments in which 3-D or depth sensors can operate without damaging or degrading the measurement performance of the sensors and, in particular, to such sensors which have rigid support structures and a plurality of optoelectronic components fixedly supported on the support structures.

OVERVIEW

Figure 5:
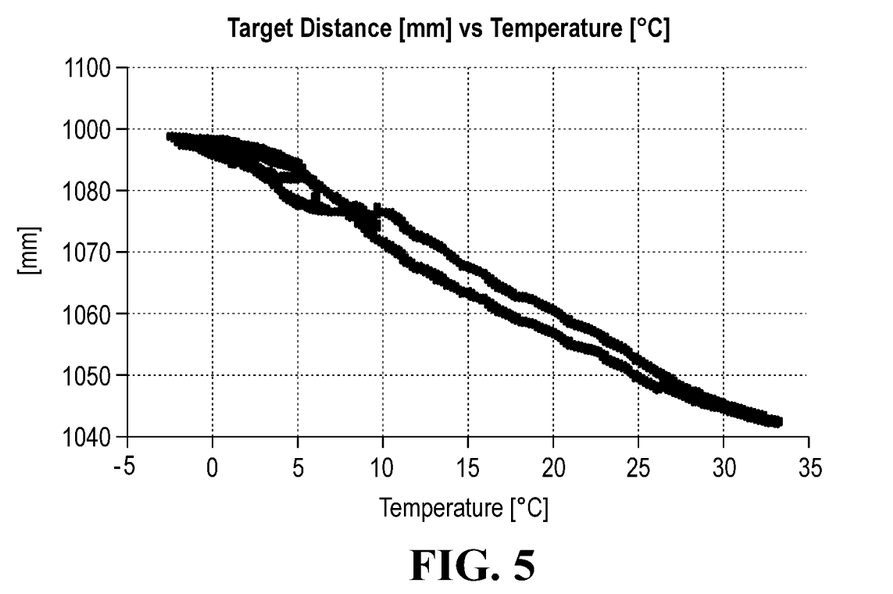
FIG. 5 is a graph of measured target distance (mm) versus temperature (° C.), the graph showing typical distance dependence on temperature.

Available 3-D or depth sensors fail to meet industrial requirements for performance under typical widely varying industrial conditions of temperature and humidity, as well as performance under hazardous industrial conditions such as are specified for hazardous (classified) environments requiring NEMA Type 7 enclosures.
1. Ambient temperature changes cause sensor measurements to drift. The magnitude of the thermal drift can be more than 1 mm/1° C. as shown in the graph of FIG. 5, which makes measurements too inaccurate for industrial use where temperature conditions can vary.
2. Extremes of ambient temperature and humidity mean that simply cooling a sensor below ambient temperature without careful attention to the atmospheric dew point will lead to surface condensation on the sensor, degrading performance and reliability of the sensor;
3. The requirement for operation under Class 1, Division 1, Groups A-d (NEMA 7, and above) conditions imposes a host of restrictions on the sensor design in terms of the sensor's operational voltage, air-tightness, etc. that cannot be met with off-the-shelf enclosures. The need for transparent optical windows, careful thermal-stabilization, and mechanical positioning accuracy makes off-the-shelf enclosures inappropriate for industrial use.

These constraints have limited the use of active 3-D depth sensors in industrial application environments.

In view of the above, there is a need for a low-cost active 3-D depth sensor working accurately over a wide range of temperature and humidity conditions. Active 3-D depth sensors use light projection methods and optical means to interrogate local surfaces yielding depth information from the environment. Tests show that significant measurement instability results from temperature-induced changes in 3-D sensor optics and 3-D structured light projector(s). This makes sensor measurements inaccurate in an environment that experiences temperature change.

There is also a need for an active 3-D depth sensor that is capable of working accurately in a volatile working environment. Volatile working environments impose special restrictions on sensor equipment regarding air-tightness, corrosion resistance, low-voltage and explosion-proof operation. Sensor housings that offer this functionality for an active 3-D sensor, with its specific needs respecting temperature control, unobstructed lines of sight, mechanical positioning accuracy and stability, and optical clarity are not currently known to the art.

Very little attention or consideration has been given, to this point, to issues of temperature stabilization and housing design for 3-D or depth sensors.

SUMMARY OF EXAMPLE EMBODIMENTS

An object of at least one embodiment of the present invention is to provide a method and a low-cost system for expanding the range of working environments in which a 3-D or depth sensor can operate without damaging or degrading the measurement performance of the sensor. The sensor has a rigid support structure and a plurality of optoelectronic components fixedly supported on the support structure.

In carrying out the above object and other objects of at least one embodiment of the present invention, the method includes providing an enclosure for the sensor, receiving an electrical signal indicative of a temperature of an interior of the enclosure and determining whether the temperature of the interior is within an operational temperature range of the sensor. The method also includes activating at least one thermoelectric device to either cool or heat the interior of the enclosure based on whether the determined temperature is above or below the range, respectively.

The support structure may be thermally conductive.

The method may further include transferring heat between the support structure and the at least one thermoelectric device.

The optoelectronic components may include a pattern emitter configured to project a known pattern of radiation and at least one detector configured to analyze the radiation pattern as it is cast onto a surface.

The enclosure may include an optically transparent window through which the sensor projects and receives visible and near visible radiation.

Further in carrying out the above object and other objects of at least one embodiment of the present invention, a system for expanding the range of working environments in which a 3-D or depth sensor can operate without damaging or degrading the measurement performance of the sensor is provided. The sensor has a rigid support structure and a plurality of optoelectronic components fixedly supported on the support structure. The system includes an enclosure for enclosing the support structure and the supported optoelectronic components within an interior of the enclosure and a temperature control circuit including a controller to monitor interior temperature within the enclosure and to regulate temperature within the enclosure to be within an operational temperature range based on the monitored temperature.

The support structure may be thermally conductive wherein the control circuit includes at least one thermoelectric device controlled by the controller to transfer heat between the support structure and atmosphere external to the enclosure.

The at least one thermoelectric device may comprise at least one Peltier device supported by the enclosure.

The control circuit may include a temperature transducer positioned within the interior of the enclosure to monitor the temperature within the enclosure.

The temperature transducer may comprise a temperature probe.

The control circuit may include at least one heat transfer pipe or bar to transfer heat between the at least one thermoelectric device and the support structure.

The control circuit may include a heat dissipation structure connected to each thermoelectric device to dissipate heat from each device to atmosphere external to the enclosure.

The control circuit may include at least one element to direct air to flow across the heat dissipation structure.

The control circuit may include control logic to determine when the interior temperature is within the operational temperature range.

The enclosure may be an airtight, thermally-insulated enclosure.

The support structure may comprise a thermally-conductive sensor rail.

The enclosure may include an optically transparent window through which the sensor projects and receives visible and near visible radiation.

The window may be double-paned.

The optoelectronic components may include a pattern emitter configured to project a known pattern of radiation.

The pattern emitter may include an IR laser diode source, or other laser source configured to operate at visible or near visible wavelengths.

The plurality of optoelectronic components may include a camera configured to view a scene at visible wavelengths.

This camera may be configured to reject light originating from the laser source.

The plurality of optoelectronic components may include one or more cameras (detectors) configured to view the projected known pattern of radiation at the wavelength emitted by the laser source.

At least one embodiment of the present invention stabilizes the temperature sensitive sensor components to reduce measurement instability in 3-D sensors by means of temperature stabilization.

Thermally-controlling an active, structured-lighting based 3-D sensor requires solving a number of sub-problems including: detecting sensor temperature, insulating the sensor, controlling the temperature of the sensor internals above or below ambient temperatures, and minimizing and/or eliminating water condensation on sensor components as only provided by the present invention as described below.

Other technical advantages will be readily apparent to one skilled in the art from the following figures, descriptions and claims. Moreover, while specific advantages have been enumerated, various embodiments may include all, some or none of the enumerated drawings.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, the method and system of at least one embodiment of the present invention provides thermal stabilization of optical components in optical 3D or depth sensors to address the need for sensors that operate in a wide variety of industrial conditions or working environments. The method and system actively control, and thus restrict, thermally-induced changes in the shapes, sizes, and other optical properties of active and passive optical components, such as lasers, lenses, mounts, and optical rails, which play a role in the measurement accuracy of 3D sensors based on time-of-flight or disparity calculations. The following methods, which may be combined or taken separately (as environmental conditions require to achieve 3D sensor thermal stabilization), are provided.

Figure 2:
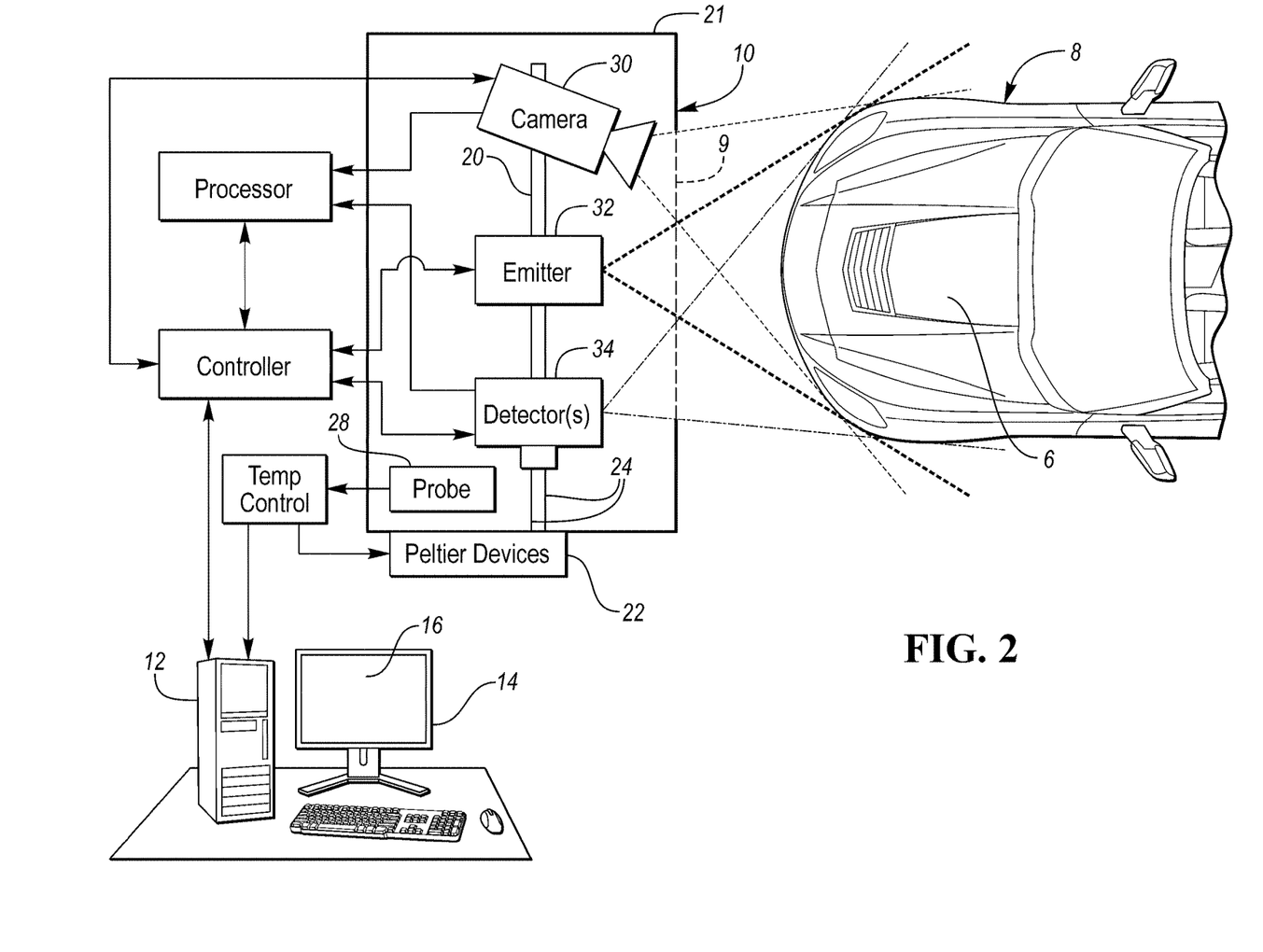
FIG. 2 is a block diagram of a 3-D or depth sensor and its enclosure and sensor rail and a temperature control circuit constructed in accordance with at least one embodiment of the present invention and being used in an industrial working environment.
Figure 3:
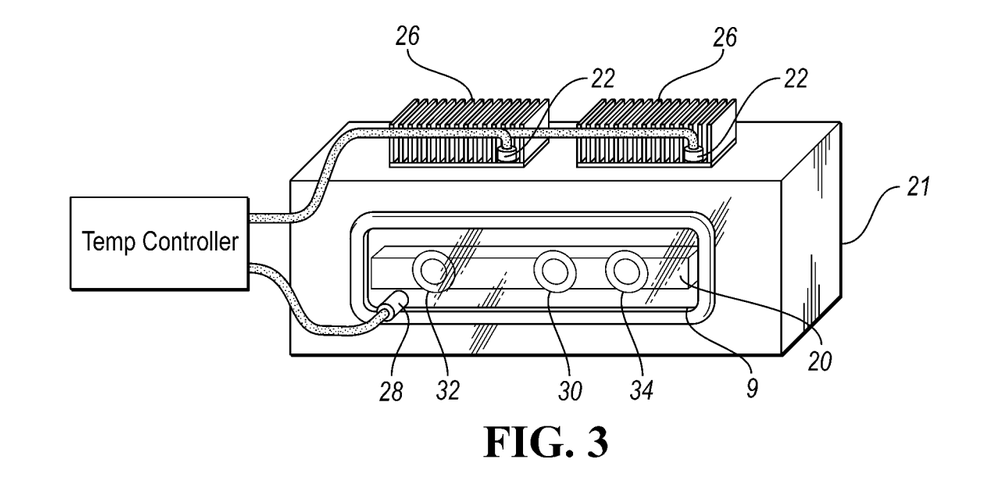
FIG. 3 is a front perspective schematic view of an assembly or system including an optical sensor or sensor rail, a hollow protective enclosure having an optical window, and a temperature control circuit constructed in accordance with at least one embodiment of the present invention.
Figure 4A:
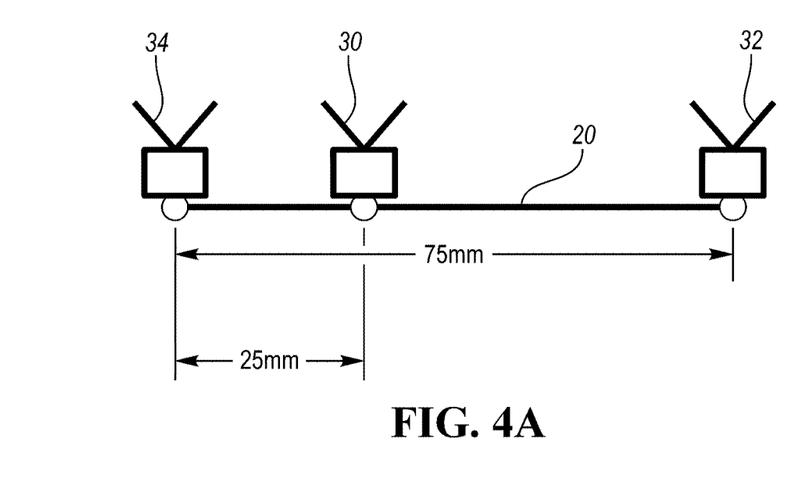
FIG. 4a is a front schematic view of the camera, emitter and detector of FIG. 2 mounted on a thermally conductive sensor rail, in which a single detector is configured to view the target object 6.
Figure 4B:
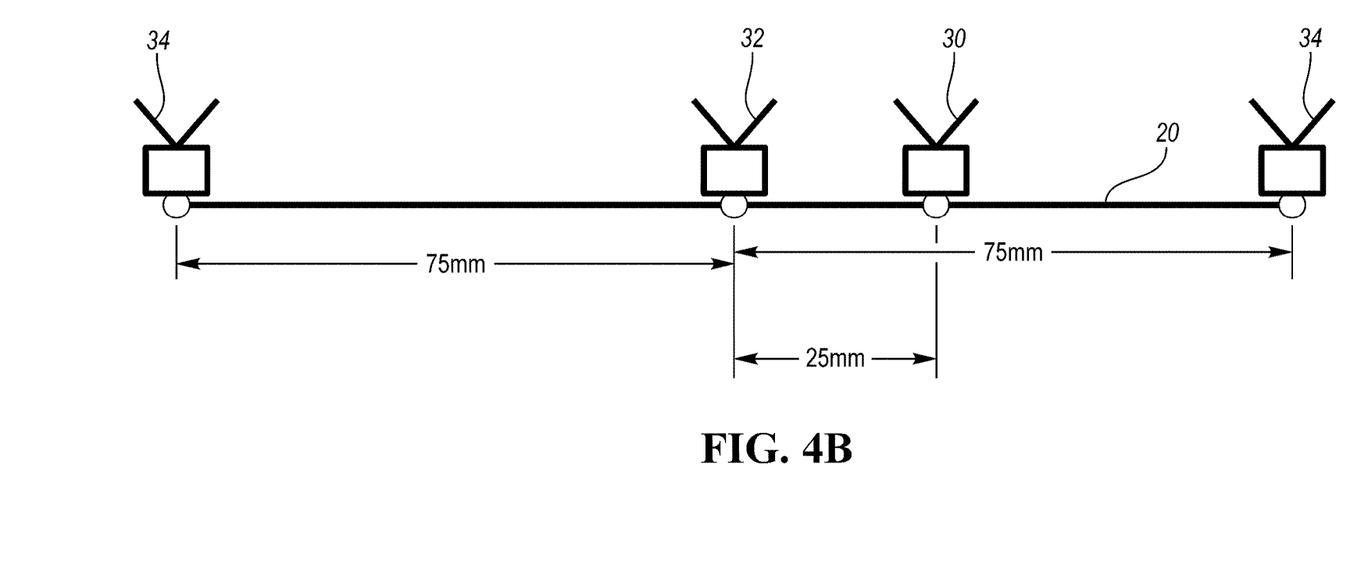
FIG. 4b is a front schematic view of the camera, emitter and detectors of FIG. 2 mounted on a thermally conductive sensor rail, in which two detectors are configured to view the target object 6.

1. Monitor sensor internal temperature near critical optical components in order to tightly regulate internal sensor temperature.
2. Enclose and insulate the sensor internals to protect them from both humidity and temperature differences with the environment.
3. Use a single detector 34 to view the light projected by the emitter 32 onto the object 6. Using means known to the art, the light pattern viewed by the detector 34 is compared with a stored representation of the light pattern emitted by the emitter 32 in order to calculate the distance to the object 6 at a plurality of points on the surface of the object 6.
4. Use two or more detectors 34 to view the light projected by the emitter 32 onto the object 6. The light patterns viewed by the various detectors 34 are compared with one another, using means known to the art, rather than with a stored representation, in order to calculate the distance to the object 6 at a plurality of points on the surface of the object 6. The use of multiple detectors 34 in this way eliminates the need to consider the effect of temperature on the pattern projected by the emitter 32.
5. Regulate sensor temperature by pumping heat into, or out of, the sensor's internals via an active heat transfer process. As shown in FIGS. 2-4, a main optical support rail 20 of a 3-D or depth sensor 10 is connected to Peltier heater/cooler elements 22 via highly conductive heat transfer piping 24. The Peltier devices 22 actively provide cooling or heating to the sensor rail 20 as directed by the sensor temperature controller. The sensor rail 20 distributes heating or cooling throughout the sensor internals leading to optical temperature stabilization. The main optical support rail 20 is a fixed, rigid internal structure to which internal electro-optical components (i.e. camera 30, emitter 32 and one or more detectors 34) of the sensor 10 are mounted. The purpose of the main optical support rail 20 is to maintain a fixed design geometry between the electro-optical components 30, 32 and 34. The main optical support rail 20 is called the 'sensor rail' for short. By making thermal contact with the sensor rail 20, the geometry of the sensor rail 20 is stabilized and the components (30, 32 and 34) which are mounted upon it are stabilized.
  a. The operation of the sensor 10 is characterized by calibrating it at its stabilized temperature, so excursions from optimum operation due to thermal drift are minimized or eliminated.
6. The sensor 10 is capable of operation in hazardous environments by providing an air-tight enclosure 21 with low-voltage operation, insensitivity to corrosive gases, and no external stators or other electro-mechanical components capable of producing ignition sparks. The air-tightness of the enclosure 21 serves both to isolate the sensor internals from ambient temperature excursions, and to protect the sensor 10 from corrosive gases.
7. The dimensions and the material of the air-tight enclosure 21 itself is carefully chosen from thermal modeling calculations to meet the simultaneous requirements of:
  a. Providing an optically-transparent window or windows 9 through which the sensor 10 may project and receive visible and near-visible radiation; and
  b. Ensuring that the temperature of the outer surface of the enclosure 21 does not fall below the atmospheric dew point within the environmental, operating range of the sensor 10.

One embodiment of a system of the present invention is shown in FIGS. 1-4. A thermally isolated box or enclosure 21 is made of 0.5" polycarbonate plastic with glass wool (not shown) filling the space between the sensor 10 and its optical or sensor rail 20. One or more optically transparent, double-paned windows 9 made of sapphire or coated high-quality polycarbonate plastic is provided through which visible and near-visible light may be projected and received by the sensor 10. A pair of Peltier coolers 22 mounted at the outer surface of the box 21 exchange heat from the optical rail 20 with the external atmosphere via copper heat pipes 24 and passive cooling fins 26. The coolers 22 are controlled by a separate temperature control unit or controller that uses input from a temperature probe 28 to determine if the system should be heated or cooled. The enclosure 21 and all electrical cabling passing through the enclosure 21 are designed to be air-tight.

A first issue resolved by at least one embodiment of the present invention is that the sensor 10 needs an optically transparent field of view. However, the window 9 must not compromise the thermal isolation of the sensor 10.

The viewing issue is resolved by using material for the window 9 that is transparent to light in the range 350 to 850 nm to form the double-paned window 9 on one side of the box 21. This makes the window 9 transparent to both the visible and near-visible light. Making the window 9 double-paned raises the thermal resistivity of the window 9 to the point where the thermal independence of the sensor 10 can be maintained, while minimizing condensation on the outer pane and minimally affecting the optical clarity of the optical path. Materials to use for the window 9 include glass, polycarbonate, quartz, and sapphire (for corrosive atmospheres where transparency of a plastic window may be affected by gases).

Another issue is that the channels used to pump heat typically need to have high thermal conductivity as well as allow for the system to be airtight.

Heat transfer from sensor internals to energy dissipating units can be done via the heat pipes 21. Highly conductive materials such as copper or aluminum bar are a preferred material. Copper has a high thermal conductivity of 401 W/(m*K) which allows for very low resistance pumping. The energy transfer pipes, or bars 24, make direct thermal contact with the internal optical rail 20 (typically made of aluminum), and form an airtight seal with the outside of the enclosure 21. One or more Peltier coolers 22 make direct thermal contact with the external surface of the heat pipes 24. The heat pipes 24 are designed in such a way such that the cross sections of the copper bars or pipes 24 matches the cross-section of the Peltier cooler 22 to maximize thermal efficiency. The bars 24 are coated with thermally insulating material in order to maximize energy transfer rates into/out of the sensor 10 as needed.

Another issue is that when connecting the heat pipes 24 to the sensor rail 20 there are multiple possible connection sites. The connection site(s) are chosen to maximize the heat pumping efficiency.

In a preferred embodiment, the heat pipes 24 are preferably connected to the main sensor rail 20 in two places, directly above the IR sensor 32, and directly above the RGB camera 30 and IR laser projector 32. Connecting the heat pipes 24 to the top of the sensor rail 20 maximizes contact area allowing for greater heat flow between the two and less thermal resistance. The pattern emitter 32 and cameras 28 and 30 are the greatest sources of heat generated by the sensor 10. By connecting the heat transfer pipes 24 adjacent these devices 28, 30 and 32 more control of the temperature distribution of the sensor rail 20 is obtained.

Another issue is that by having the sensor temperature differ from the ambient temperature one runs the risk of condensation forming on the housing exterior. This has the potential to obstruct the sensor's view if condensation occurs on the window 9. Condensation is detrimental to the lifespan of the sensor 10. Typical adverse conditions are 40° C. and 90% humidity.

To prevent condensation, at equilibrium the exterior surface of the enclosure 21 must be at a temperature above the dew point of the ambient environment. This dew point is dependent on both the temperature and humidity of the environment. For example, the dew point is ~38° C. for an ambient temperature of 40° C. and 90% humidity. The method for achieving an exterior surface temperature above this point is to maximize the casing's thermal resistance by packing the interior of the sensor enclosure 21 with insulating materials such as glass wool (not shown). Thermal modeling shows that for a 0.5" polycarbonate box or enclosure 21 and glass wool filler of 0.5" thickness, or greater, if the interior temperature is kept at 27° C., under the worst conditions (40° C. and 90% humidity) the exterior surface temperature is above the dew point of 38° C.

Still another issue is that the heat generated and extracted by the Peltier coolers 22 may need to be dissipated to the surrounding environment.

There are three possibilities for doing this: passive external cooling fins, active fan-assisted cooling fins, and externally-controlled air sources to expedite heat dissipation. Depending on requirements, one or more of these following methods might be used.

1. Passive external cooling fins (i.e. 26 in FIG. 3) are the easiest to implement and do not require external power or controlled air sources. Moreover, the fins 26 require no energy to work and thus are safe for hazardous locations. One drawback is the spatial footprint required for the fins 26. Further this footprint may need to change based on the environmental operating conditions.
2. Active, fan-assisted cooling provides a small compact form factor capable of dissipating more energy than passive cooling fins of the same size. Thus, active fans provide a greater degree of control over the system energy transfer rates, as well as being able to work in tighter spaces, than passive cooling fins. The drawbacks are that the system has moving components that can break, uses electricity which requires power, and presents electrical sparking challenges that may be difficult to overcome in hazardous locations where explosive compounds may be present at dangerous levels.
3. Externally-controlled air sources provide the benefit of increasing energy transfer rates by blowing air through passive fins or active fans, or across the sensor housing 21 itself. Much greater cooling efficiencies for passive fin or active, fan driven cooling methods are achieved. External air sources can easily be combined with either methods 1 or 2 above, as appropriate.

Yet another issue is that in order to keep the optical properties of the sensor 10 fixed one needs to be able to monitor whether the sensor 10 is within its operational temperature range. If the internal temperature is too high, the system needs to be cooled, and if it is too low, it needs to be heated. Knowing whether the sensor 10 is in the operational temperature range is particularly important just after turning the system on. Immediately after startup the internal temperature will most likely be outside this temperature range and will require a warm-up/cool-down period to adjust itself as shown by the graph of FIG. 6.

This issue is resolved by actively monitor the internal sensor temperature with one or more temperature probes 28. The digital temperature controller uses data from the temperature probe(s) 28 to command that the Peltier chips or devices 22 add or remove heat from the system, as needed to stabilize the internals within a particular range (e.g. 0.2 degrees Celsius, in a preferred embodiment) of a temperature set point.

Figure 6:
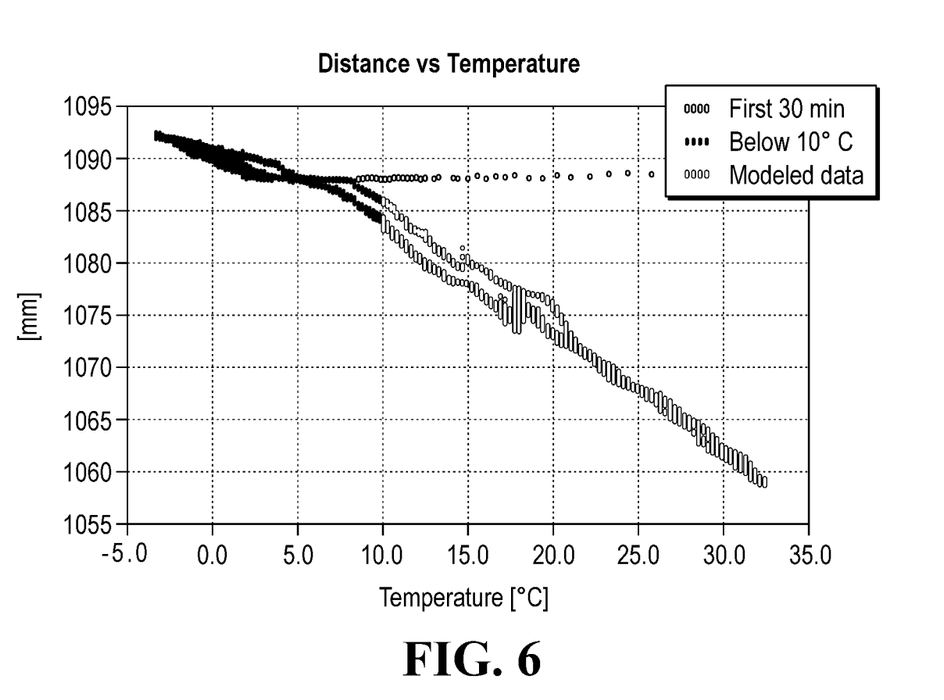
FIG. 6 is a graph similar to the graph of FIG. 5, the graph showing warm-up and extreme temperatures.

The sensor electronics are configured so that, if the sensor's internal temperature is outside the operational temperature range of the sensor 10 (for example, during the initial warm-up or cool-down phase upon initial start-up as shown in FIG. 6) the sensor electronics may provide a READY/NOTREADY signal which may be used to determine when the sensor 10 can be used to measure with its designed accuracy.

The temperature control circuit (including temperature probe(s), peltier cooler(s), heat pipe(s), heat dissipation fin(s) and/or fan(s), and control electronics) can be configured to drive the Peltier coolers 22 to both heat and cool the system as needed. The warming-up/cooling-down phase typically lasts around 30-40 minutes and the software or control logic of the temperature controller indicates when it first enters the operational temperature range.

Figure 1:
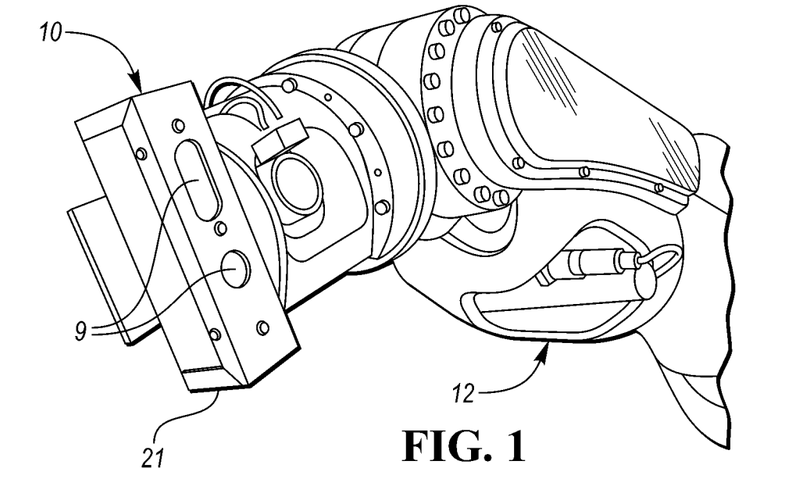
FIG. 1 is a perspective view, partially broken away, of an optical sensor enclosed or housed within an enclosure and mounted on the distal end of a robot arm wherein optically transparent windows of the sensor are shown.

The system of at least one embodiment of the present invention includes a 3-D or depth sensor such as 2.5D volumetric or 2-D/3-D hybrid sensor. FIG. 1 shows a housing or container 21 of the sensor 10 mounted on the distal end of a robot arm 12. FIG. 3 shows the sensor 10 positioned near a vehicular body 8 including a hood 6 in an industrial work environment.

The sensor technology described herein is sometimes called "3-D" because it measures X, Y and Z coordinates of objects within a scene. This can be misleading terminology. Within a given volume, these sensors only obtain the X, Y and Z coordinates of the surfaces of objects; the sensors are not able to penetrate objects in order to obtain true 3-D cross-sections, such as might be obtained by a CAT scan of the human body. For this reason, the sensors are often referred to as 2½-D sensors which create 2½ dimensional surface maps to distinguish them from true 3-D sensors which create 3-D tomographic representations of not just the surface, but also the interior of an object.

In spite of this distinction between 2.5-D and 3-D sensors, people in the vision industry will often speak of 2.5-D sensors as 3-D sensors. The fact that "3-D Vision" sensors create 2.5-D surface maps instead of 3-D tomographs is implicit.

Referring again to FIG. 2, preferably these sensors each comprise a pattern projector or emitter 32 operating at some wavelength one or more cameras or detectors 34 configured to receive light at wavelength and a visible light, monochromatic or color camera 30 configured to view light at visible wavelengths, but to reject light near wavelength 'L'. The pattern is projected by the emitter 32 onto the surface of the vehicle and is read by one or more detectors 34 along with the information from the visible light camera 30. The laser projector 32 operates by means of diffractive optical elements to project several tens of thousands of laser pencils or beams onto a scene to be analyzed. The detector 34 analyzes the scene at wavelength 1' to locate the intersections of the laser pencils with the scene and then uses geometry to calculate the distance to objects in the scene. The visible light camera 30 in a preferred embodiment is used to associate a color or monochrome intensity to each portion of the analyzed image.

The pattern emitter 32 may be comprised of an infrared laser diode emitting at 830 nm and a series of diffractive optics elements. These components work together to create a laser "dot" pattern. The laser beam from the laser diode is shaped in order to give it an even circular profile then passed through two diffractive optics elements. The first element creates a dot pattern containing dots, the second element multiplies this dot pattern into a grid. When the infrared pattern is projected on a surface, the infrared light scattered from the surface is viewed by one or more detectors 34 configured to be sensitive in the neighborhood of 830 nm.

In addition to the IR sensor 34, there may be the RGB sensor or camera 30 configured to be sensitive in the visible range, with a visible light, band-pass filter operative to reject light in the neighborhood of 830 nm. During operation, the IR sensor 34 is used to calculate the depth of an object and the RGB sensor 30 is used to sense the object's color and brightness. This provides the ability to interpret an image in what is traditionally referred to as two and a half dimensions. It is not true 3-D due to the sensor 10 only being able to detect surfaces that are physically visible to it (i.e., it is unable to see through objects or to see surfaces on the far side of an object).

Alternatively, the 3-D or depth sensor 10 may comprise light-field, laser scan, time-of-flight or passive binocular sensors, as well as active monocular and active binocular sensors.

Preferably, the 3-D or depth sensor 10 of at least one embodiment of the invention measures distance via massively parallel triangulation using a projected pattern (a "multi-point disparity" method). The specific types of active depth sensors which are preferred are called multipoint disparity depth sensors.

"Multipoint" refers to the laser projector or emitter 32 which projects thousands of individual beams (aka pencils) onto a scene. Each beam intersects the scene at a point.

"Disparity" refers to the method used to calculate the distance from the sensor 10 to objects in the scene. Specifically, "disparity" refers to the way a laser beam's intersection with a scene shifts when the laser beam projector's distance from the scene changes.

"Depth" refers to the fact that these sensors are able to calculate the X, Y and Z coordinates of the intersection of each laser beam from the laser beam projector 32 with a scene.

"Passive Depth Sensors" determine the distance to objects in a scene without affecting the scene in any way; they are pure receivers.

"Active Depth Sensors" determine the distance to objects in a scene by projecting energy onto the scene and then analyzing the interactions of the projected energy with the scene. Some active sensors project a structured light pattern onto the scene and analyze how long the light pulses take to return, and so on. Active depth sensors have both emitters and receivers.

For clarity, the sensor 10 is preferably based on active monocular, multipoint disparity technology as a "multipoint disparity" sensor herein. This terminology, though serviceable is not standard. A preferred monocular (i.e., a single infrared camera) multipoint disparity sensor is disclosed in U.S. Pat. No. 8,493,496. A binocular multipoint disparity sensor, which uses two infrared cameras to determine depth information from a scene, is also preferred.

Multiple volumetric sensors may be placed in key locations around and above the vehicle. Each of these sensors typically captures hundreds of thousands of individual points in space. Each of these points has both a Cartesian position in space and an associated RGB color value. Before measurement, each of these sensors is registered into a common coordinate system. This gives the present system the ability to correlate a location on the image of a sensor with a real world position. When an image is captured from each sensor, the pixel information, along with the depth information, is converted by a computer 12 (i.e. FIG. 2) into a collection of points in space, called a "point cloud".

A point cloud is a collection of data representing a scene as viewed through a "vision" sensor. In three dimensions, each datum in this collection might, for example, consist of the datum's X, Y and Z coordinates along with the Red, Green and Blue values for the color viewed by the sensor 10 at those coordinates. In this case, each datum in the collection would be described by six numbers. To take another example: in two dimensions, each datum in the collection might consist of the datum's X and Y coordinates along with the monotone intensity measured by the sensor 10 at those coordinates. In this case, each datum in the collection would be described by three numbers.

The computer 12 of FIG. 2 controls a controller which, in turn, controls a processor, the temperature controller, the camera 30, the emitter 32 and the detector 34 of the sensor 10.

At least one embodiment of the present invention uses a hybrid 2-D/3-D sensor 10 to measure color, brightness and depth at each of hundreds of thousands of pixels. The collective 3-D "point cloud" data may be presented on a screen 16 of a display 14 (i.e. FIG. 2) as a 3-D graphic.

The field of view of the 2-D/3-D sensor 10 can be as wide as several meters across, making it possible for the user to see a hinged part such as a door or the hood 6 relative to the vehicle body 8 in 3-D. The graphic on the screen 16 may look like the 3-D part the user sees in the real world.

Embodiments of the invention can take the form of an entirely hardware embodiment, an entirely software embodiment or an embodiment containing both hardware and software elements. In a preferred embodiment, the invention including control logic is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of expanding the range of working environments in which a 3-D or active depth sensor can operate without damaging or degrading the measurement performance of the sensor, the sensor having a rigid, thermally conductive, sensor rail and a plurality of optoelectronic components including a pattern emitter capable of projecting a known pattern of radiation and one or more cameras or detectors configured to view the projected known pattern of radiation, each of the components being mounted on and in thermal contact with the sensor rail which distributes heating or cooling to the components, the method comprising the steps of:

provide an airtight, thermally-insulated enclosure for the sensor, wherein the enclosure includes an optically transparent window through which the pattern emitter projects and the one or more cameras or detectors receive visible and near-visible radiation;

receiving an electrical signal indicative of a temperature of an interior of the enclosure;

determining whether the temperature of the interior is within an operational temperature range of the sensor;

activating at least one thermoelectric device disposed outside the enclosure to either cool or heat the interior of the enclosure based on whether the determined temperature is above or below the range, respectively; and pumping heat either into or out of the enclosure between the sensor rail and the at least one thermoelectric device to either heat or cool the interior of the enclosure, respectively, based on whether the determined temperature is below or above the range, respectively, to regulate the internal temperature of the sensor.

2. A system for expanding the range of working environments in which a 3-D or active depth sensor can operate without damaging or degrading the measurement performance of the sensor, the sensor having a rigid, thermally-conductive sensor rail and a plurality of optoelectronic components including a pattern emitter configured to project a known pattern of radiation and one or more cameras or detectors configured to view the projected known pattern of radiation, each of the components being mounted on and in thermal contact with the sensor rail which distributes heating or cooling to the components, the system comprising:

an airtight, thermally-insulated enclosure for enclosing the support structure and the optoelectronic components within an interior of the enclosure, wherein the enclosure includes an optically transparent window through which the patterns emitter projects and the one or more cameras or detectors receive visible and near-visible radiation; and a temperature control circuit including a controller to actively monitor interior temperature within the enclosure and to regulate temperature within the enclosure to be within an operational temperature range of the sensor based on the monitored temperature, wherein the control circuit further includes at least one thermoelectric device disposed outside the enclosure and controlled by the controller and at least one heat transfer pipe or bar in direct thermal contact with the at least one thermoelectric device, extending through the enclosures and forming an airtight seal with the outside of the enclosure and configured to be in direct thermal contact with the sensor rail to pump heat either into or out of the enclosure to either heat or cool the interior of the enclosure, respectively, wherein heat is transferred between the at least one thermoelectric device and the sensor rail based on whether the monitored interior temperature is below or above the range.

3. The system as claimed in claim 2, wherein the at least one thermoelectric device comprises at least one Peltier device supported by the enclosure.

4. The system as claimed in claim 2, wherein the control circuit includes a temperature transducer positioned within the interior of the enclosure to monitor the temperature within the enclosure.

5. The system as claimed in claim 4, wherein the temperature transducer comprises a temperature probe.

6. The system as claimed in claim 2, wherein the control circuit includes a heat dissipation structure connected to a thermoelectric device to dissipate heat from the thermoelectric device to atmosphere external to the enclosure.

7. The system as claimed in claim 6, wherein the control circuit includes at least one element to direct air to flow across the heat dissipation structure.

8. The system as claimed in claim 2, wherein the control circuit includes control logic to determine when the interior temperature is within the operational temperature range.

9. The system as claimed in claim 2, wherein the window is double-paned.

10. The system as claimed in claim 2, wherein the pattern emitter includes an IR laser diode source or other laser source configured to operate at visible or near-visible wavelengths.

11. The system as claimed in claim 10, wherein the optoelectomeric components include a camera configured to view a scene at visible wavelengths.

12. The system as claimed in claim 11, wherein the camera is configured to reject light originating from the laser source.

13. The system as claimed in claim 10, wherein the one or more cameras or detectors is configured to view the projected known pattern of radiation at a wavelength emitted by the laser source.

* * * * *